(12) United States Patent
Li et al.

(10) Patent No.: US 11,719,717 B2
(45) Date of Patent: Aug. 8, 2023

(54) WHISPERING GALLERY MODE INERTIAL SENSOR AND METHOD

(71) Applicant: UCL Business Ltd., London (GB)

(72) Inventors: Ying Lia Li, Bristol (GB); Peter Francis Barker, Berkhamsted (GB)

(73) Assignee: UCL Business Ltd., London (GB)

( * ) Notice: Subject to any disclaimer, the term of this patent is extended or adjusted under 35 U.S.C. 154(b) by 437 days.

(21) Appl. No.: 16/630,015

(22) PCT Filed: Jun. 20, 2018

(86) PCT No.: PCT/GB2018/051712
§ 371 (c)(1),
(2) Date: Jan. 10, 2020

(87) PCT Pub. No.: WO2019/012245
PCT Pub. Date: Jan. 17, 2019

(65) Prior Publication Data
US 2021/0088549 A1 Mar. 25, 2021

(30) Foreign Application Priority Data
Jul. 11, 2017 (GB) ..................... 1711156

(51) Int. Cl.
*G01P 15/093* (2006.01)
*G01P 3/36* (2006.01)

(52) U.S. Cl.
CPC .............. *G01P 15/093* (2013.01); *G01P 3/36* (2013.01)

(58) Field of Classification Search
CPC .......... G01P 15/093; G01P 3/36; G01P 15/14; G01C 19/5642; G01C 19/72
See application file for complete search history.

(56) References Cited

U.S. PATENT DOCUMENTS

2003/0206693 A1* 11/2003 Tapalian ............... G01P 15/093
385/28
2011/0255094 A1* 10/2011 Mohageg ............... G01C 19/72
356/461

(Continued)

FOREIGN PATENT DOCUMENTS

WO 2011119232 A2 9/2011
WO 2013010182 A2 1/2013

OTHER PUBLICATIONS

"Whispering gallery mode sensors" by Foreman et al. (Year: 2015).*

(Continued)

*Primary Examiner* — Xin Y Zhong
(74) *Attorney, Agent, or Firm* — MacMillan, Sobanski & Todd, LLC

(57) ABSTRACT

A whispering gallery mode inertial sensor includes a whispering gallery mode resonator; an evanescent coupler configured to couple with an evanescent field of the resonator so that light is transmitted to and received from the resonator by the coupler; a displacement sensor configured to determine a displacement of the resonator according to the light received from the resonator by the coupler; a controller configured to determine an acceleration and/or rate of rotations experienced by the resonator based on the displacement of the resonator, the controller being further configured to apply a restoring force to the resonator in a closed feedback loop based on the displacement of the resonator in order to maintain a predetermined mechanical state of the resonator; and a timing sensor configured to determine a timing signal based on an optical frequency comb produced by the resonator.

18 Claims, 6 Drawing Sheets

(56) References Cited

U.S. PATENT DOCUMENTS

2013/0003766 A1\* 1/2013 Savchenkov ........... H01S 5/142
372/32
2016/0069686 A1\* 3/2016 Lee ..................... G01C 19/661
356/460

OTHER PUBLICATIONS

Patents Act 1977: Search Report under Section 17(5), Application No. GB1711156.8, dated Jan. 3, 2018.
International Search Report and Written Opinion, Application No. PCT/GB2018/051712, dated Sep. 12, 2018.

\* cited by examiner

WHISPERING GALLERY MODE INERTIAL SENSOR AND METHOD

CROSS-REFERENCE TO RELATED APPLICATIONS

This application is the National Phase of International Application PCT/GB2018/051712 filed Jun. 20, 2018, which designated the U.S. That International Application was published in English under PCT Article 21(2) on Jan. 17, 2019 as International Publication Number WO 2019/012245A1. PCT/GB2018/051712 claims priority to U.K. Patent Application No. 1711156.8 filed Jul. 11, 2017. Thus, the subject non-provisional application also claims priority to U.K. Patent Application No. 1711156.8 filed Jul. 11, 2017. The disclosures of all of these applications are incorporated herein by reference.

TECHNICAL FIELD

The present disclosure relates to a whispering gallery mode inertial sensor and is particularly, although not exclusively, concerned with a whispering gallery mode inertial sensor configured to provide improved position, navigation and timing information.

BACKGROUND

When satellite navigation system signals, e.g. from Global Positioning System satellites, are unavailable to devices that use information about their position in order to operate effectively, the devices may be configured to refer to sensors provided on the device in order to estimate changes in their position and orientation. Such sensors typically comprise gyroscopes and accelerometers, the signals from which are integrated in order to determine rotation and displacement of the device.

Sensors, such as gyroscopes and accelerometers, typically have limited accuracy and are susceptible to measurement drift over extended periods of operation. These inaccuracies in the measurements from the sensors are amplified by integrating the acceleration signals in order to determine the rotation and/or displacement.

Furthermore, gyroscopes, accelerometers and the time sources used for performing integration of the acceleration signals are often susceptible to electromagnetic interference, which can significantly affect the accuracy with which the devices are able to determine their positions following an extended period of operating without receiving satellite navigation system signals.

A system that provides improved accuracy when navigating in the absence of signals from satellite navigation systems is desirable.

STATEMENTS OF INVENTION

According to an aspect of the present disclosure, there is provided a whispering gallery mode inertial sensor comprising: a whispering gallery mode resonator; an evanescent coupler configured to couple with an evanescent field of the whispering gallery mode resonator so that light is transmitted to and received from the whispering galley mode resonator by the evanescent coupler; a displacement sensor configured to determine a displacement of the whispering gallery mode resonator according to the light, e.g. the properties of the light, received from the whispering gallery mode resonator by the evanescent coupler; a controller configured to determine an acceleration and or rate of rotation experienced by the whispering gallery mode resonator based on the displacement of the whispering gallery mode resonator, the controller being further configured to apply a restoring force to the whispering gallery mode resonator in a closed feedback loop based on the displacement of the whispering gallery mode resonator in order to maintain a predetermined mechanical state of the whispering gallery mode resonator; and a timing sensor configured to determine a timing signal based on an optical frequency comb produced by the whispering gallery mode resonator.

The predetermined mechanical state of the whispering gallery mode resonator may correspond to a state in which the whispering gallery mode resonator oscillates at one or more predetermined frequencies, phases and/or amplitudes, in one or more directions respectively. In some arrangements, the amplitude of oscillations in one or more directions may be substantially zero. In other words, the predetermined mechanical state may be a state in which the whispering gallery mode resonator is stationary, e.g. at a fixed position, in one or more directions.

The acceleration experienced by the whispering gallery mode resonator may be determined according to an error signal generated by the controller, e.g. within the closed feedback loop. The error signal may be determined by comparing a signal from the displacement sensor with a set point input The controller may be configured to apply proportional, integral and/or differential feedback control within the closed feedback loop to determine the magnitude of the restoring force to be applied.

The timing sensor may be configured to adjust the timing signal according to a signal from the controller, e.g. generated within the closed feedback loop. The timing signal may be adjusted in order to improve the accuracy of the timing signal. The accuracy of the timing signal may be reduced if the whispering gallery mode resonator is being displaced, e.g. due to acceleration or rotations of the whispering gallery mode inertial sensor or by virtue of the predetermined mechanical state. Applying a correction based on the signal from the controller, e.g. generated within the closed feedback loop based on the displacement, may allow the accuracy of the timing signal to be improved, e.g. restored to an accuracy that may be achieved if the whispering gallery mode resonator had not been displaced.

Alternatively, the timing signal may be adjusted, e.g. corrected, by changing the properties of the light, such as intensity, frequency and amplitude modulation frequency, used to generate the optical frequency comb.

The whispering gallery mode inertial sensor may further comprise an actuator configured to apply the restoring force. The actuator may comprise a piezoelectric element configured to control the displacement of the whispering gallery mode resonator. The piezoelectric element may be coupled to a support structure of the whispering gallery mode resonator, e.g. a beam or frame configured to support the whispering gallery mode resonator.

Additionally or alternatively, the controller may be configured to apply the restoring force by varying the intensity and/or frequency of light transmitted to the whispering gallery mode resonator by the evanescent coupler, or a further evanescent coupler, so as to control an optical force acting on the whispering gallery mode resonator, e.g. between the whispering gallery mode resonator and the evanescent coupler. In other words, the actuator may comprise the evanescent coupler or a further evanescent coupler.

Additionally or alternatively again, the controller may be configured to apply the restoring force by varying an externally applied electrostatic force experienced by electrodes placed around or within the whispering gallery mode resonator structure.

The whispering gallery mode inertial sensor may comprise a light source, such as a laser, configured to provide light to the whispering gallery mode resonator. The light may be supplied to the whispering gallery mode resonator via the evanescent coupler. The frequency and/or polarization of light provided by the light source may be selected according to a whispering gallery mode resonant frequency of the whispering gallery mode resonator.

The light source may be configured to supply two or more frequencies and/or polarizations of light to the evanescent coupler. Light may be supplied in one direction, e.g. a first direction, and may additionally be supplied in a second direction opposite to the first direction. In other words, the light supplied to the evanescent coupler may be unidirectional or bi-directional. Light supplied in the first and second directions may have different frequencies and/or polarizations.

A first frequency of light may be selected according to the whispering gallery mode resonant frequency of the whispering gallery mode resonator. A second frequency and/or the intensity of light supplied at the second frequency may be selected in order to apply an appropriate force to the whispering gallery mode resonator. Alternatively, the whispering gallery mode inertial sensor may comprise a further light source, e.g. a further laser, configured to provide the second frequency of light to the evanescent coupler or a further evanescent coupler. In other words, the actuator may comprise the light source or further light source. The second frequency of light may be a higher frequency than the first frequency.

The evanescent coupler may comprise a wave guide, such as an optical fibre, e.g. a tapered optical fibre, a prism or any other form of wave guide. The whispering gallery mode inertial sensor may comprise two or more evanescent couplers arranged orthogonally to one another or otherwise configured such that coupling between the two or more evanescent couplers and the whispering gallery mode resonator varies as the whispering gallery mode resonator is displaced in two or more orthogonal directions.

The whispering gallery mode inertial sensor may comprise two or more displacement sensors configured to determine the displacement of the whispering gallery mode resonator in the two or more orthogonal directions. Each of the displacement sensors may be associated with an evanescent coupler and may be configured to determine the displacement of the whispering gallery mode resonator based on the degree of coupling between the whispering gallery mode resonator and the associated evanescent coupler.

The controller may be configured to apply two or more restoring forces, e.g. to the whispering gallery mode resonator, in directions orthogonal to one another, in order to maintain the predetermined mechanical state of the whispering gallery mode resonator in the respective directions.

The whispering gallery mode inertial sensor may comprise two or more actuators, e.g. within an actuator assembly, arranged orthogonally to one another or otherwise configured such that the force applied to the whispering gallery mode resonator are orthogonal to one another, e.g. in directions parallel to the directions in which the displacement of the whispering gallery mode resonator is determined by the displacement sensors.

The orientations of the evanescent couplers, displacement sensors and/or the directions in which the controller applies the restoring forces, e.g. the directions of the actuators, may correspond to one another. In other words, the orientations of the evanescent couples may correspond to the orientations of the displacement sensors and/or the restoring forces. The controller may be configured to apply the restoring forces to the whispering gallery mode resonator according to the displacement determined by the displacement sensor having a corresponding orientation.

The predetermined mechanical state of the whispering gallery mode resonator may be a state in which the whispering gallery mode resonator is substantially stationary, e.g. in one, more than one or all directions of the whispering gallery mode inertial sensor.

Alternatively, the predetermined mechanical state of the whispering gallery mode resonator may be a state in which the whispering gallery mode resonator is caused to vibrate, e.g. oscillate, in one or more predetermined directions, e.g. orthogonal directions, at one or more frequencies.

For example, in the predetermined mechanical state the whispering gallery mode resonator may oscillate in a first predetermined direction at a first predetermined frequency. The whispering gallery mode resonator may remain substantially stationary in directions other than the first predetermined direction. Alternatively, in the predetermined mechanical state, the whispering gallery mode resonator may oscillate in a second predetermined direction at a second predetermined frequency. The second predetermined direction may be orthogonal to the first predetermined direction. The first and second predetermined directions may correspond to the orientations of the actuators, evanescent couplers and/or displacement sensors. The first and second predetermined frequencies may be different from one another. Furthermore, the amplitudes and/or phases of the oscillations in the first and second directions may differ. Alternatively, the amplitude and phase of the oscillations in the first and second directions may be the same.

The whispering gallery mode resonator may be supported on a cantilever beam. The cantilever beam may have a circular, oval, obround, square or rectangular cross-section. Alternatively, the cantilever beam may have any other desirable cross-section.

In some arrangements, the whispering gallery mode resonator may be supported by two or more cantilever beams extending from the whispering gallery mode resonator to a frame. The cantilever beams and the frame may be configured such that the whispering gallery mode resonator can become displaced in one or more directions under inertial forces experienced by the whispering gallery mode resonator.

The whispering gallery mode inertial sensor, e.g. the controller of the whispering gallery mode inertial sensor or a further controller, such as a signal processor, may be configured to determine a linear acceleration experienced by the whispering gallery mode resonator in one or more directions, e.g. one or more orthogonal directions. For example, the whispering gallery mode inertial sensor may be configured to determine a linear acceleration experienced in one, two or three orthogonal directions.

Additionally or alternatively, the whispering gallery mode inertial sensor may be configured to determine a rate of rotation of the whispering gallery mode resonator one or more directions. For example, the whispering gallery mode inertial sensor may be configured to determine a rate of rotation experienced in one direction and optionally a linear acceleration experienced in one, two or three directions.

Alternatively, the whispering gallery mode inertial sensor may be configured to determine rates of rotation experienced in two directions, and optionally a linear acceleration experienced in one, two or three directions. Alternatively again, the whispering gallery mode inertial sensor may be configured to determine a rate of rotation in three directions, and optionally a linear acceleration in one, two or three directions.

Due to the Coriolis effect, rotation of the whispering gallery mode resonator leads to a component of the oscillations of the whispering gallery mode resonator being driven at a first frequency in a first direction to be detected in a second and/or third direction, e.g. by second and/or third displacement sensors, at the first frequency. Additionally or alternatively, oscillations of the whispering gallery mode resonator being driven at a second frequency in the second direction may be detected in the first and/or third directions at the second frequency. The rate of rotation experienced by the whispering gallery mode resonator may thereby be determined by measuring a magnitude of oscillations of the whispering gallery mode resonator at the first frequency in the second direction and/or at the second frequency in the first direction. The first and second frequencies may be selected such that oscillations of the whispering galley mode resonator at the first and second frequencies are substantially uncoupled. A position, navigation and timing system may comprise the above-mentioned whispering gallery mode inertial sensor.

The position, navigation and timing system may be configured to determine a displacement and/or angle of rotation of the system, e.g. over a predetermined period of time, according to linear accelerations and/or rates of rotation determined by the whispering gallery mode resonator, e.g. during the predetermined period of time, and the timing signal determined by the timing sensor. For example, the position navigation and timing system may integrate the linear acceleration and/or rates of rotation using the timing signal.

According to another aspect of the present disclosure, there is provided a method of operating a whispering gallery mode inertial sensor, wherein the whispering gallery mode inertial sensor comprises: a whispering gallery mode resonator; and an evanescent coupler configured to couple with an evanescent field of the whispering gallery mode resonator, wherein the method comprises: supplying light to the evanescent coupler, so that light is transmitted to and received from the whispering galley mode resonator by the evanescent coupler; determining a displacement of the whispering gallery mode resonator according to the light received from the whispering gallery mode resonator by the evanescent coupler; determining an acceleration experienced by the whispering gallery mode resonator based on the displacement of the whispering gallery mode resonator, applying a restoring force to the whispering gallery mode resonator in a closed feedback loop based on the displacement of the whispering gallery mode resonator in order to maintain a predetermined mechanical state of the whispering gallery mode resonator; and determining a timing signal based on an optical frequency comb produced by the whispering gallery mode resonator.

The method may further comprise supplying light bi-directionally to the evanescent coupler in order to establish counter-propagating whispering gallery mode resonances within the whispering gallery mode resonator.

The method may comprise supplying light of two or more frequencies, intensities, phases and/or polarizations in order to establish two or more whispering gallery mode resonances of the light within the whispering gallery mode resonator. The light may be supplied via a single evanescent coupler, e.g. bi-directionally, or via two or more evanescent couplers.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention

BRIEF DESCRIPTION OF THE DRAWINGS

For a better understanding of the present invention, and to show more clearly how it may be carried into effect, reference will now be made, by way of example, to the accompanying drawings in which.

DETAILED DESCRIPTION

Figure 1:
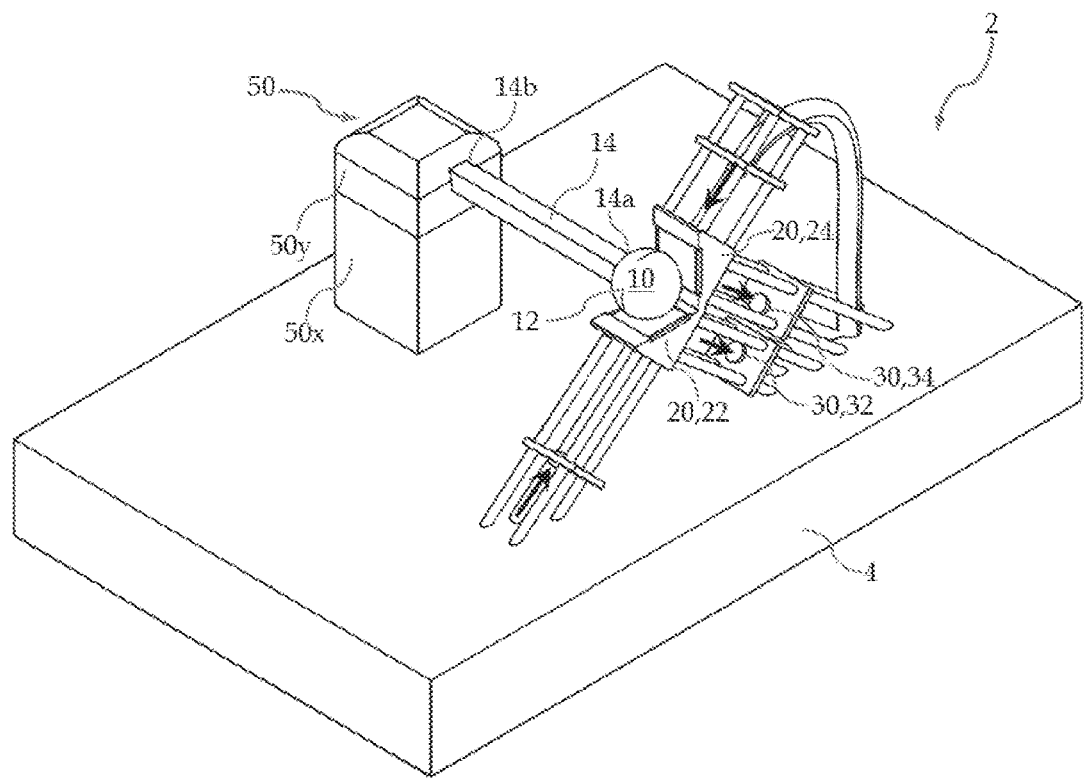
FIG. 1 is a schematic perspective view of a whispering gallery mode resonator assembly for an inertial sensor according to arrangements of the present disclosure.
Figure 2:
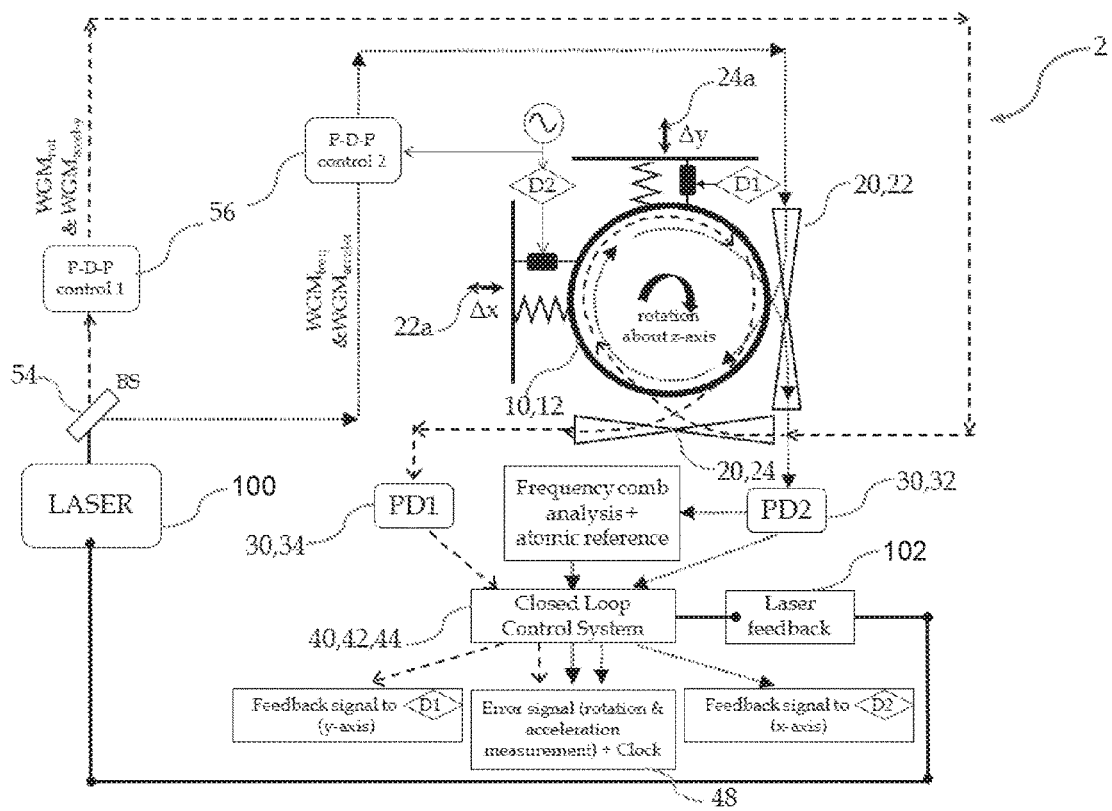
FIG. 2 is a schematic view of a whispering gallery mode inertial sensor according to arrangements of the present disclosure.
Figure 3:
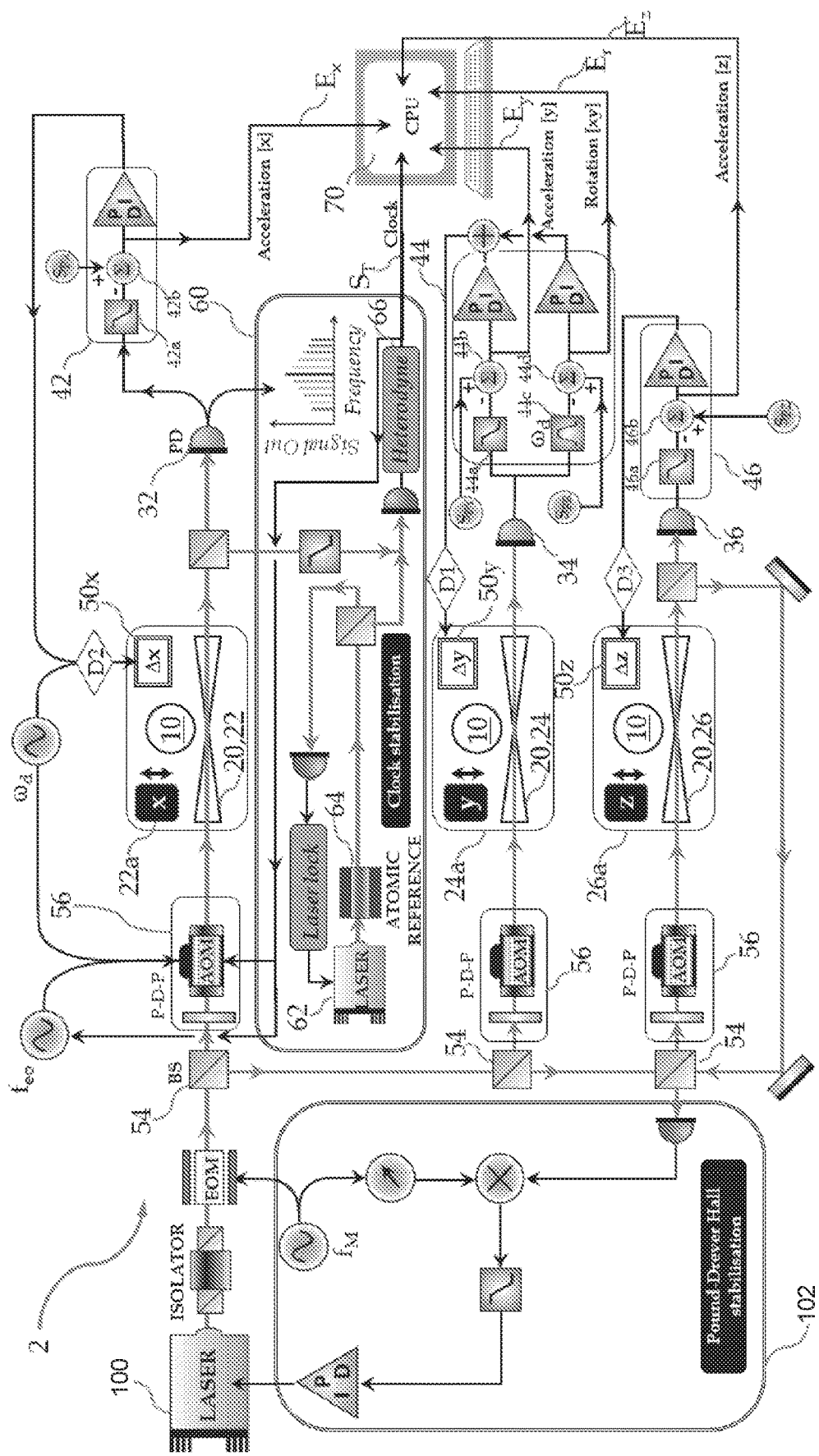
FIG. 3 is a schematic view of a whispering gallery mode inertial sensor, according to arrangements of the present disclosure, configured to measure accelerations in three directions.

With reference to FIGS. 1, 2 and 3, a Whispering Gallery Mode (WGM) inertial sensor 2 according to arrangements of the present disclosure comprises a WGM resonator 10, one or more evanescent couplers 20, one or more sensors 30 configured to determine a displacement of the WGM resonator 10 and a controller 40 configured to determine an acceleration experienced by the WGM resonator.

In the arrangements shown in FIGS. 1 and 2, the WGM resonator 10 comprises a substantially spherical body 12. The WGM resonator 10 is supported by a cantilever 14. The WGM resonator 10 is formed from a substantially transparent, dielectric material, such as glass or plastic, capable of permitting light to pass though the WGM resonator. The spherical body 12 may be coupled, e.g. fixedly coupled, to the cantilever 14. In the arrangement depicted in FIG. 1, the spherical body 12 is formed integrally with the cantilever 14.

When light of a particular frequency is introduced to the WGM resonator 10, the light waves are guided around the spherical body 12 due to total internal reflection of the light within the spherical body 12, establishing a whispering gallery mode resonance of light within the WGM resonator 10.

The evanescent couplers 20 may comprise wave guides, such as prisms, as depicted in FIG. 1, optical fibres, e.g. tapered optical fibres as depicted in FIGS. 2 and 3, or any other desirable form of wave guide. The evanescent couplers 20 are configured to allow light to be introduced to the WGM resonator via the evanescent couplers 20.

In the arrangement shown in FIG. 1, two evanescent couplers 20 are provided. The first and second evanescent couplers 22, 24 of the WGM inertial sensor shown in FIG. 1 are prisms. However, the present disclosure applies equally to any other form of evanescent coupler provided within the WGM inertial sensor 2.

The prisms 22, 24 are arranged about the WGM resonator 10. The prisms 22, 24, are positioned such that evanescent fields of each of the prisms 22, 24 are at least partially coupled with the WGM resonator 10. In this way, light, e.g. laser light, introduced into the prisms 22, 24 can be transmitted into the WGM resonator 10 in order to establish two separate whispering gallery mode resonances of light within the whispering gallery mode resonator 10.

As depicted in FIGS. 2 and 3, the WGM inertial sensor 2 comprises a light source, e.g. a laser 100, configured to generate light to be directed into the evanescent couplers 20. A stabilization system 102, such as a Pound-Drever Hall stabilization system, is provided to stabilize the frequency of light generated by the laser 100.

In the arrangement shown in FIG. 3, the WGM inertial sensor 2 comprises one or more beam splitters 54 configured to split the beam of laser light produced by the laser 100 into a plurality of separate laser beams. In the particular arrangement shown, one beam splitter 54 is associated with each of the evanescent couplers 20 and is configured to direct a beam of laser light to the associated evanescent coupler 20.

In alternative arrangements, the WGM inertial sensor 2 may comprise a plurality of lasers, each of the lasers being associated with one of the evanescent couplers 20 and configured to provide laser light to the associated evanescent coupler.

As shown in FIGS. 2 and 3, The WGM inertial sensor 2 further comprises Polarization, Detuning and Power (P-D-P) optics 56 associated with each of the evanescent couplers. The P-D-P optics 56 are configured to separately control the polarization, detuning and power of each of the beams of laser light being provided to the respective evanescent couplers 20. The use of P-D-P optics 56 allows multiple WGM resonances to be excited such that simultaneous measurements of different forces, e.g. in different directions, can be measured with minimal crosstalk or coupling between the measurements. In some arrangements, light of two different frequencies, intensities, phases and/or polarization may be supplied to the same evanescent coupler, e.g. bi-directionally, in order to establish two separate whispering gallery mode resonances within the WGM resonator.

The P-D-P optics 56 may comprise a waveplate and/or an acousto-optic-modulator. Additionally or alternatively, other P-D-P optical devices may be provided as desired.

Due to the evanescent coupling of the WGM resonator 10 and the evanescent couplers 22, 24, light waves can also be transmitted back from the WGM resonator 10 to the evanescent couplers 22, 24. The proportion, e.g. the relative intensity, and/or the delay, e.g. the phase, of the light that is transmitted back to the evanescent couplers 22, 24 is dependent on the level of coupling with the WGM resonator 10, which in turn depends on the distance between the evanescent couplers 22, 24 and the WGM resonator 10. Each of the evanescent couplers 22, 24 can guide multiple optical signals bi-directionally, which can be decoupled from one another by the use of the P-D-P optics 56.

With reference to FIGS. 2 and 3, the WGM inertial sensor 2 comprises a first sensor 32 and a second sensor 34. The first and second sensors 32, 34 may be photo detectors or any other sensors capable of determining an intensity of light detected by the sensors.

The first sensor 32 is configured to determine the intensity of light transmitted from the WGM resonator 10 to the first evanescent coupler 22 and the second sensor 34 is configured to determine the intensity of light transmitted from the WGM resonator 10 to the second evanescent coupler 24. The first sensor 32 is thereby configured to determine a displacement of the WGM resonator 10 in a first direction 22a and the second sensor 34 is configured to determine a displacement of the WGM resonator 10 in a second direction 24a.

The first and second directions 22a, 24a depend on orientations and/or configurations of each of the evanescent couplers 22, 24. In particular, the first and second directions 22a, 24a correspond to directions in which displacement of the WGM resonator 10 affects the level of coupling between the WGM resonator and the first and second evanescent couplers 22, 24 respectively. For example, the first and second directions 22a, 24a may be directions perpendicular to directions of the evanescent fields of the first and second evanescent couplers 22, 24 and/or principle directions in which laser light travels through the respective evanescent couplers 22, 24.

In order to allow displacements of the WGM resonator 10 to be measured in two directions, the evanescent couplers 20 may be oriented about the WGM resonator 10 at an angle to one another, e.g. a non-zero angle, or otherwise configured such that coupling of each of the evanescent couplers 20 and the WGM resonator 10 varies as the WGM resonator 10 is displaced in different directions. For example, when the evanescent couplers 20 comprise tapered optical fibres, as shown in FIGS. 2 and 3, the evanescent couplers 20 may be arranged such that axes of the optical fibres are not parallel, e.g. are perpendicular to one another.

In the arrangements depicted in FIGS. 1, 2 and 3, the evanescent couplers 20 are configured and oriented such that the first direction 22a corresponds to a y direction of the WGM inertial sensor 2, e.g. parallel with a notional y axis of the WGM inertial sensor, and the second direction 24a corresponds to an x direction of the WGM inertial sensor, e.g. parallel with a notional x axis of the WGM inertial sensor 2 and perpendicular to the y direction. However, other arrangements of the evanescent couplers 20 are also envisaged.

The WGM inertial sensor 2 further comprises an actuator assembly 50. The WGM resonator 10 is supported relative to a base 4 of the WGM inertial sensor 2 via the actuator assembly 50. As depicted in FIG. 1, the spherical body 12 of the WGM resonator 10 is coupled to the cantilever at a first end 14a of the cantilever, and a second end 14b of the cantilever is coupled to the actuator assembly 50.

During operation of the WGM inertial sensor 2, the controller 40 is configured to apply a force to the WGM resonator 10, e.g. by controlling the operation of the actuator assembly 50, in order to maintain the whispering gallery mode resonator 10 in a predetermined mechanical state. When the mechanical state is one in which the WGM resonator 10 is substantially stationary, e.g. in one or more directions, the WGM resonator 10 may be maintained at a constant separation distance from one or more of the evanescent couplers 20.

The predetermined mechanical state of the WGM resonator 10 may be a state in which the WGM resonator 10, e.g. the spherical body 12 of the WGM resonator is substantially stationary relative to the base 4. As the WGM inertial sensor 2 undergoes accelerations and rotations, inertial forces experienced by the WGM resonator 10 act to displace the WGM resonator 10 relative to the evanescent couplers 20. In order to maintain the predetermined mechanical state of the WGM resonator 10, the controller 40 may be configured to provide a restoring force to the WGM resonator 10, e.g. by operating the actuator assembly 50, to balance the inertial forces.

In some arrangements, the predetermined mechanical state may be a state in which the WGM resonator 10 moves, e.g. oscillates, at one or more predetermined frequencies, phases and/or amplitudes in one or more directions respectively. The inertial forces experienced by the WGM resonator 10 may affect the oscillations of the WGM resonator 10, e.g. the frequency, amplitude and/or phase of the oscillations. The controller 40 may therefore apply a restoring force to the WGM resonator in order to maintain the predetermined mechanical state, e.g. the frequency, amplitude, and/or phase of the oscillations of the WGM resonator 10.

For example, in the arrangements shown in FIGS. 1 and 2, the WGM resonator 10 is in a mechanical state in which the WGM resonator 10 oscillates at a predetermined frequency $\omega_d$ and amplitude in the first direction 22a and remains stationary, e.g. has no displacement, in the second direction 24a.

The actuator assembly 50 may be configured to apply forces to the WGM resonator 10 in two or more directions. For example, the actuator assembly 50 may be configured to apply forces in the first and second directions 22a, 24a in which displacement of the WGM resonator 10 is determined. As shown in FIG. 1, the actuator assembly 50 comprises a plurality of actuators, such as first and second piezoelectric elements 50x, 50y configured to apply forces to the WGM resonator 10 in the first and second directions 22a, 24a respectively.

The controller 40 is configured to control the operation of the actuators 50x, 50y in order to maintain the WGM resonator 10 in the predetermined mechanical state.

With reference to FIG. 3, the controller 40 comprises feedback modules 42, 44 configured to apply closed-loop feedback control in order to generate control signals for controlling the operation of the actuator assembly 50. The controller 40 comprises a first feedback module 42 configured to generate control signals for controlling the operation of the first piezo electric element 50x and a second feedback module 44 configured to generate control signals for controlling the operation of the second piezo electric element 50y.

The feedback modules 42, 44 may each comprise a filter, such as low pass filters 42a, 44a. The filters 42a, 44a may be configured to filter out frequencies equal to and greater than the predetermined frequency $\omega_d$ at which the WGM resonator 10 oscillates when in the predetermined mechanical state. In other words, the filters 42a, 44a may be configured to pass signals relating to accelerations of the WGM inertial sensor at frequencies less than the predetermined frequency $\omega_d$. In this way, accelerations of the WGM inertial sensor 2 at frequencies less than the predetermined frequency $\omega_d$ can be distinguished from those relating to the predetermined mechanical state of the WGM resonator 10. The predetermined frequency $\omega_d$ may be set to a value greater than a natural frequency of a first mode of vibration of the WGM resonator 10 and the cantilever 14.

The feedback modules 42, 44 may each comprise a comparator 42b, 44b configured to compare the measurements from the first and second sensors 32, 34 with respective set point input signals $S_{PX}$, $S_{PY}$. The set point input signals $S_{PX}$, $S_{PY}$ may correspond to desired displacements of the WGM resonator 10 in the first and second directions 22a, 24a respectively. Accordingly, the comparators 42b, 44b generate first and second error signals $E_X$, $E_Y$ indicative of the displacement of the WGM resonator 10 from the set points in the first and second directions 22a, 24a. The feedback modules 42 may be configured to apply proportional, differential and/or integral feedback control using the error signals in order to generate control signals for controlling the operation of the actuator assembly 50.

As shown in FIG. 3, when the predetermined mechanical state is one in which the WGM resonator oscillates in a particular direction, the set point input provided to the comparator of the feedback module corresponding to the particular direction may not include the oscillating signal to drive the actuator, for example, the set point input may provide a constant input, such as 0 (zero). Instead, the oscillating signal may be added to the output of the feedback mode provided to the actuator, e.g. at the actuator. In alternative arrangements, the set point input may comprise the oscillating signal.

In the arrangement shown in FIG. 2, the controller 40 comprises a sensor determination module 48 that may be configured to determine the acceleration experienced by the WGM inertial sensor 2 based on the displacement of the WGM resonator 10. The sensor determination module 48 receives the error signals $E_X$, $E_Y$ from the feedback modules 42, 44 and may determine the acceleration of the WGM resonator in the first and second directions 22a, 24a based on the error signals.

Alternatively, as depicted in FIG. 3, a further controller 70, e.g. a signal processor, may be configured to receive the error signals $E_X$, $E_Y$ from the feedback modules 42, 44 and determine the acceleration experienced by the WGM inertial sensor 2, e.g. for the purposes of navigation. The further controller 70 may be provided as part of the WGM inertial sensor 2 or may be separate from the WGM inertial sensor 2.

As described above, the predetermined mechanical state of the WGM resonator depicted in FIGS. 1, 2 and 3 is one in which the WGM resonator is substantially stationary in the y direction, and is oscillating at a predetermined frequency $\omega_d$ and amplitude in the x direction. When the WGM inertial sensor 2 rotates about an axis perpendicular to the x and y directions, e.g. about a z direction parallel to a notional z axis of the WGM inertial sensor, or about an axis with a component in the z direction, a Coriolis force acts on the WGM resonator causing a portion of the oscillating motion of the WGM resonator in the x direction to be detected by the second sensor 34, e.g. in the y direction.

The portion, e.g. relative amplitude, of the oscillating motion that is introduced into the y direction is dependent on the rate of rotation of the WGM inertial sensor. Hence, by determining the relative amplitude of the oscillations detected in the y direction, e.g. using the second sensor 34, the controller 40 is able to determine a rate of rotation of the WGM inertial sensor 2 in the z direction, e.g. about the z axis of the WGM inertial sensor 2.

As depicted in FIG. 3, the second feedback module 44 may comprise a further filter 44c, such as a band pass filter, configured to isolate signals from the second sensor 34 at or close to the predetermined frequency $\omega_d$. The isolated signals may be compared with a rotation set point input signal $S_{PR}$ by a further comparator 44d in order to generate a rotation error signal $E_R$. The rotation error signal $E_R$ may be used by the further controller 70 (or the sensor determination module 48, or a further module, where provided) to determine the rate of rotation experienced by the WGM inertial sensor 2. The rotation error signal $E_R$ may be combined with the second error signal $E_Y$ for controlling the actuator assembly to provide the restoring force, so that the actuator assembly 50 is accurately controlled to maintain the predetermined state of the WGM resonator in the second direction 24a.

Interaction of the laser light with the dielectric material of the WGM resonator 10 also leads to the production of an optical frequency comb due to non-linear optical processes such as four-wave mixing of the laser light within the WGM resonator 10. The frequency comb can be detected using the first sensor 32, the second sensor 34 or a further sensor. Control of the frequency comb characteristics, such as comb spacing, can be controlled by modulating the intensity of the laser light, e.g. at a frequency $f_{eo}$. As depicted in FIGS. 2 and 3, the WGM inertial sensor 2 further comprises a timing sensor 60 configured to determine a timing signal $S_T$ based on the optical frequency comb. As shown in FIG. 3, the timing sensor 60 may comprise a timing laser 62, an atomic reference 64 and a heterodyne detection scheme 66. The timing sensor 60 may provide the timing signal $S_T$ to the further controller 70 (or the sensor determination module 48, or another module).

If the WGM resonator 10 is accelerating, for example, due to the predetermined mechanical state of the WGM resonator 10 being one in which the WGM resonator 10 oscillates at a predetermined frequency and/or due to the inertial forces experienced by the WGM resonator 10, the formation of the frequency comb may be affected, e.g. as the coupling between the WGM resonator 10 and evanescent couplers 22, 24 varies, which may affect the accuracy of the timing signal. The closed-loop feedback control of the WGM resonator reduces the likelihood that the timing signal will be affected. Additionally, the timing sensor 60 and/or the further controller 70 (or sensor determination module 48, or other module) may be configured to adjust their operation, e.g. based on the acceleration and or rotation of the WGM resonator, in order to improve the accuracy of the timing signal $S_T$.

The timing signal may be adjusted, e.g. directly adjusted, by the timing sensor 60 and/or the further controller 70 (or sensor determination module 48, or other module).

In some arrangements, the timing signal may be adjusted, e.g. corrected, by adjusting the properties of the laser light, such as intensity, frequency and/or amplitude modulation frequency, used to generate the optical frequency comb. The properties of the laser light may be adjusted by controlling the operation of the relevant P-D-P optics 56. The properties of the laser light may be controlled by the controller 40, e.g. the first feedback module 42 or another module of the controller, based on the displacement of the WGM resonator, e.g. determined by the first sensor 32. Alternatively, the P-D-P optics 56 may be controlled based on the error signal $E_X$ generated by the first, second or third feedback module 42, 44, 46. Alternatively again, the P-D-P optics may be controlled by another controller, such as the further controller 70, e.g. based on the displacement and/or acceleration of the WGM resonator and/or signals from the feedback modules 42, 44, 46.

In the arrangements depicted in FIGS. 1, 2 and 3, the WGM resonator 10 is substantially spherical and the cantilever 14 has a substantially square cross-section. However, as depicted in FIGS. 4a, 4b, 4c, 4d and 4e, it is also envisaged that the WGM resonator 10 may be any other shape capable of supporting a whispering gallery mode resonance of light within it. For example, the WGM resonator may be toroidal or disc shaped, e.g. a cylindrical or tapered disc. Additionally, the cantilever 14 may have any desirable cross-section. For example, the cantilever 14 may have a circular, oval, ovoid, or rectangular cross-section.

Figure 4A:
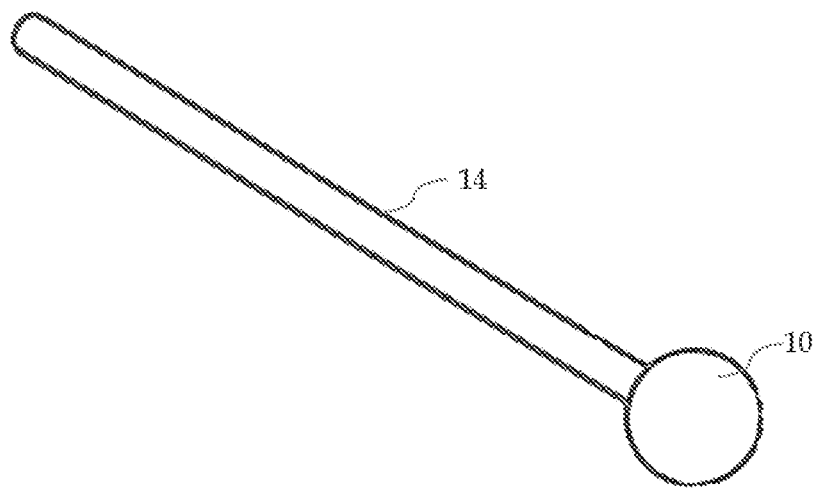
FIGS. 4a, 4b, 4c, 4d and 4e, collectively referred to as FIG. 4, are perspective views of a plurality of whispering gallery mode resonators according to arrangements of the present disclosure.
Figure 4B:
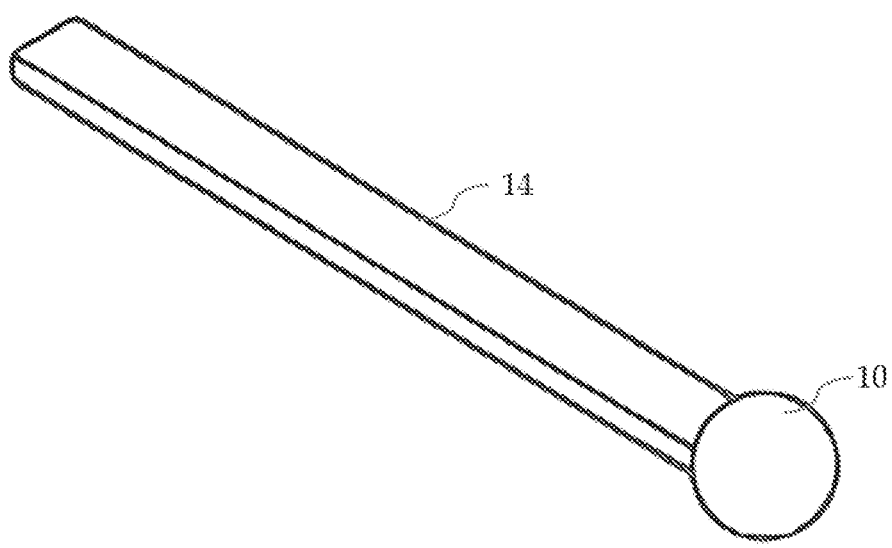
Figure 4C:
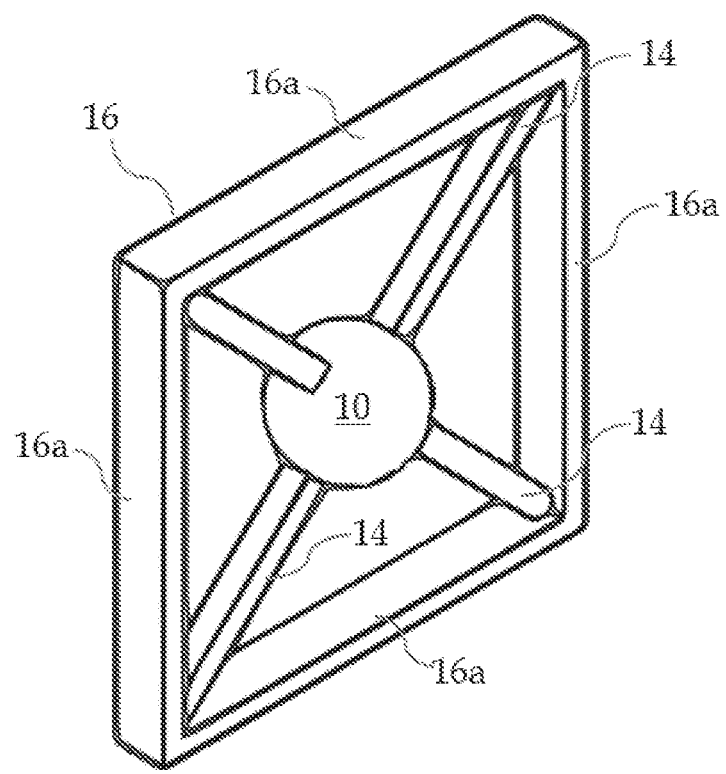
Figure 4D:
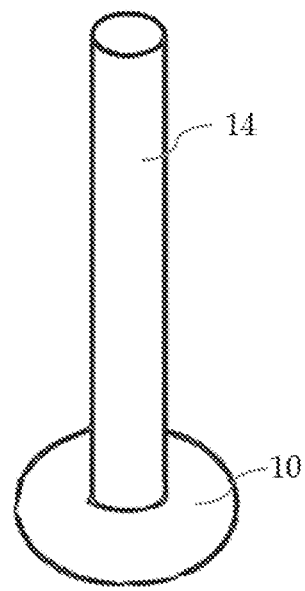
Figure 4E:
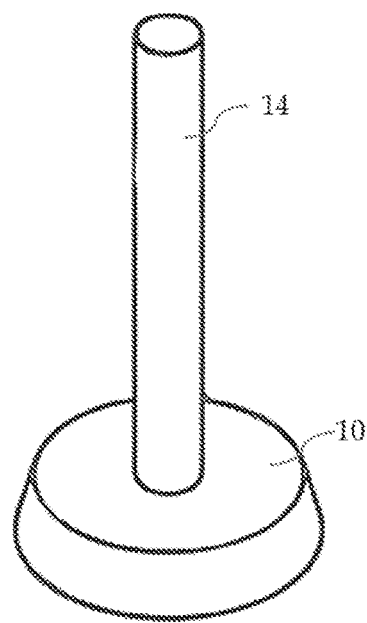

As depicted in FIG. 4c, in some arrangements, the WGM resonator 10 may be supported by more than one cantilever 14. For example, the WGM resonator may be supported by four cantilevers 14 extending from the WGM resonator 10, e.g. the spherical body 12 of the WGM resonator, to a support frame 16 of the WGM resonator 10.

The support frame 16 may comprise four, elongate members 16a arranged at 90 degrees to one another such that the members of the support frame 16 form a square. The cantilevers 14 may extend from the WGM resonator to the corners of the support frame, e.g. to joints between elongate members 16a of the support frame. In other arrangements, the support frame 16 may comprise any other desirable arrangement of members 16a of any desirable shape.

The cantilevers 14 and the support frame 16 may be configured such that the WGM resonator 10 can be displaced in three directions, e.g. the x, y and z directions of the WGM inertial senor 2, under inertial forces experienced by the WGM resonator 10. Additionally, the cantilevers 14 and the support frame 16 may be configured such that restoring forces can be applied to the WGM resonator in the three directions. For example, by providing actuators, e.g. piezo electric elements or electrostatic elements, on the cantilevers 14 and/or support frame 16.

Figure 5:
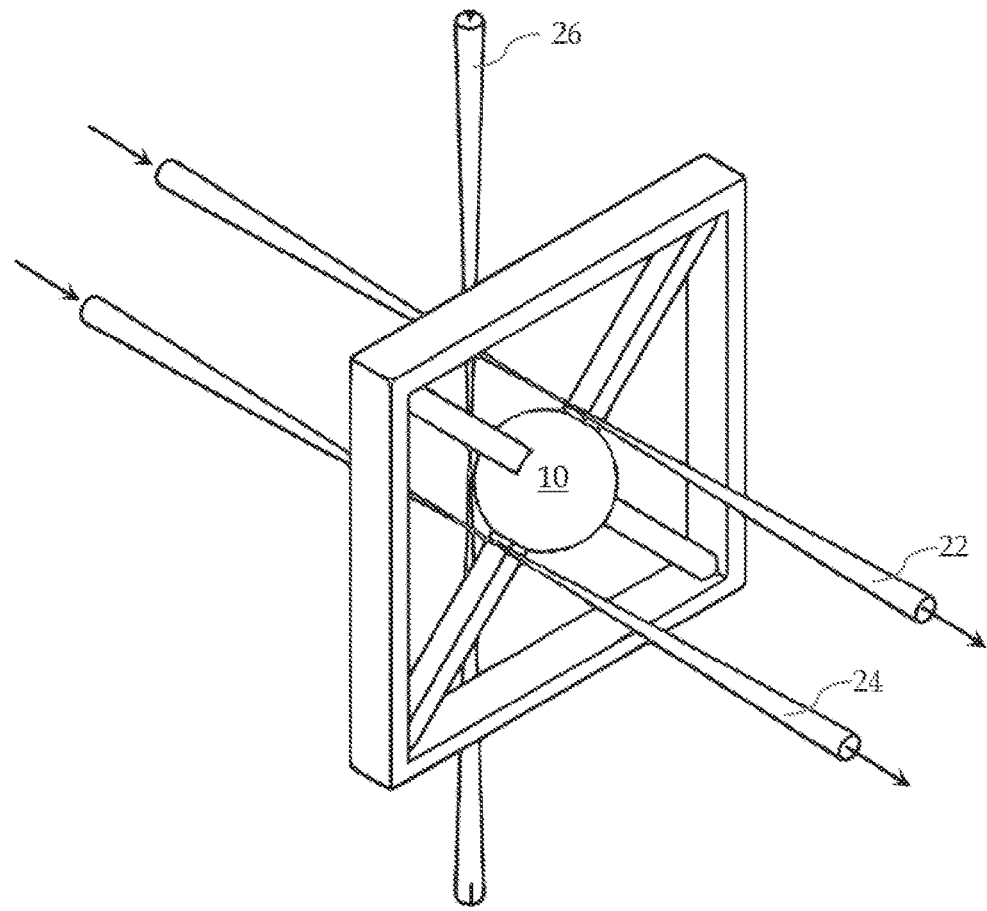
FIG. 5 is a perspective view of a whispering gallery mode resonator configured to allow accelerations to be measured in three dimensions.
Figure 6:
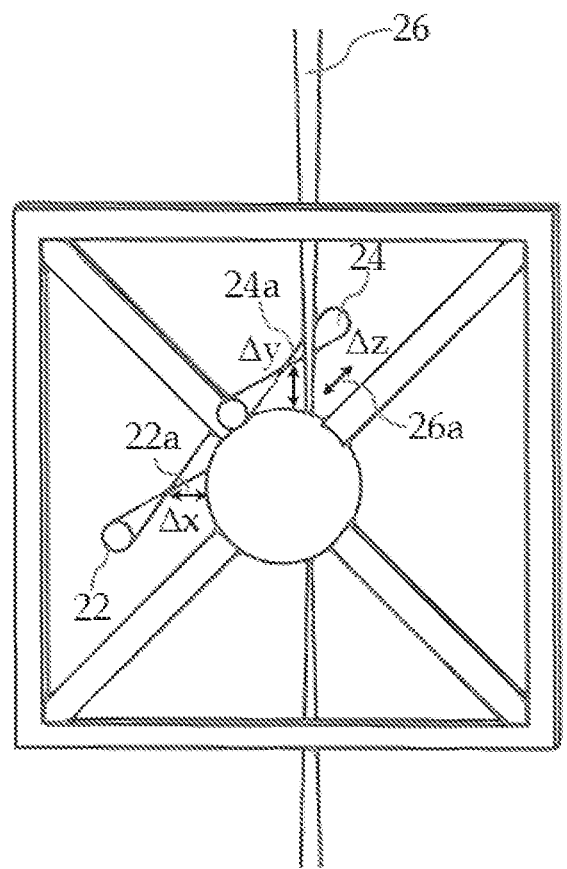
FIG. 6 is a front view of the whispering gallery mode resonator configured to allow accelerations to be measured in three dimensions.

With reference to FIGS. 5 and 6, when the cantilevers 14 and/or the support frame 16 are configured such that the WGM resonator 10 can be deflected in three directions due to inertial forces experienced by the WGM resonator 10, it may be desirable to provide first, second and third evanescent couplers 22, 24, 26 arranged about the WGM resonator 10 such the level of evanescent coupling between the WGM resonator 10 and the first, second and third evanescent couplers varies as the WGM resonator is displaced in the first, second and third directions 22a, 24a, 26a respectively, e.g. in x, y, and z directions of the WGM inertial sensor 2.

As depicted in FIGS. 5 and 6, first, second and third evanescent couplers 22, 24, 26, comprise tapered optical fibres. First and second tapered optical fibres 22, 24 are arranged parallel to one another and are spaced about the WGM resonator 10 such that evanescent coupling of the first and second tapered optical fibres 22, 24 with the WGM resonator 10 varies as the WGM resonator 10 is displaced in the x and y directions of the WGM inertial sensor 2 respectively. The third tapered optical fibre 26 is arranged orthogonally to the first and second tapered optical fibres 22, 24 and is arranged relative to the WGM resonator 10 such that evanescent coupling of the third tapered optical fibre varies 26 as the WGM resonator 10 is displaced in the third direction. In other arrangements, the evanescent couplers may be arranged about the WGM resonator in any other desirable arrangement. For example, each of the evanescent couplers may be arranged orthogonally to one another. In some arrangements, a different, e.g. greater, number of evanescent couplers may be provided.

Returning to FIG. 3, when the first, second and third evanescent couplers 22, 24, 26 are provided about the WGM resonator 10 as described above, the WGM inertial sensor 2 comprising the WGM resonator 10 can be extended, e.g. compared to the WGM inertial sensor 2 depicted in FIGS. 1 and 2, to enable accelerations of the WGM inertial sensor 2 to be determined in three directions.

As depicted in FIG. 3, the extended WGM inertial sensor 2 comprises a third evanescent coupler 26 configured such that coupling of the third evanescent coupler 26 with the WGM resonator 10 varies as the WGM resonator is displaced in a third direction 26a, e.g. in the z direction of the WGM inertial sensor.

The extended WGM inertial sensor 2 further comprises a third sensor 36 configured to determine the intensity of light being transmitted from the WGM resonator 10 back to the third evanescent coupler 26. Additionally, the controller 40 further comprises a third feedback module 46 configured to receive a measurement signal from the third sensor 36 and apply closed-loop feedback control to the actuator assembly 50, e.g. a third piezo electric element 50z of the actuator assembly 50. The third piezoelectric element may provide a restoring force to the WGM resonator 10, e.g. to counteract any inertial forces experienced by the WGM resonator in the z direction, to maintain the predetermined mechanical state of the WGM resonator 10.

The third feedback module 46 is similar to the first feedback module 42 described above and comprises a filter 46a, and a comparator 46b configured to compare the measurement signal from the third sensor 36 with a set point input signal $S_{PZ}$ in order to generate an error signal $E_Z$ to be used for generating a control signal for controlling the operation of the actuator assembly 50.

The error signal $E_Z$ generated by the third feedback module 46, is also provided to the further controller 70 of the WGM inertial sensor 2 (or the acceleration determining module 48 of the controller 40 if no further controller 70 is provided). The acceleration determine module 48 or the further controller 70 is configured to determine the acceleration of the WGM inertial sensor 2 in the third direction 26a, e.g. in addition to determining the acceleration of the WGM inertial sensor 2 in the first and second directions 22a, 24a.

In the arrangement shown in FIG. 3, the WGM inertial sensor 2 is not configured to determine a rate of rotation of the WGM inertial sensor 2 about the y axis of the WGM inertial sensor, and hence, the third feedback module 46 does not comprise a further, band pass filter or a further comparator similar to those provided in the second feedback module 44. However, in other arrangements, third feedback module 46 may be configured in a similar way to the second feedback module 44 and may be configured to determine a rate of rotation of the WGM inertial sensor 2 about the y axis of the WGM inertial sensor, or an axis parallel to the y direction, in the same way as rotations about the z axis are determined, as described above.

In other arrangements, the WGM inertial sensor 2 may be configured to determine a rate of rotation of the WGM inertial sensor about the x axis of the WGM inertial sensor 2, or an axis parallel to the x direction. In order to allow rotations about the x axis to be determined, a predetermined mechanical state of the WGM resonator may be selected in which the WGM resonator is oscillating at the predetermined frequency, or a further predetermined frequency, in one of the second and third directions of the WGM resonator 10. Rotations of the WGM inertial sensor 2 about the x axis will thereby lead to oscillations of the WGM resonator 10 at the predetermined frequency, or further predetermined frequency, in the other of the second and third directions. The corresponding one of the second and third feedback modules can then be configured to isolate oscillations of the WGM resonator 10 at or close to the predetermined frequency and provide an error signal to the further controller 70 (or sensor determination module 48, or further module) to allow the rate of rotation of the WGM inertial sensor 2 about the x axis to be determined.

In some arrangements, the predetermined mechanical state of the WGM resonator 10 may be set such that the WGM resonator 10 oscillates in two or more directions at two or more different predetermined frequencies. Two or more of the feedback modules 42, 44, 46 may be configured to isolate signals relating to oscillations at different ones of the predetermined frequencies. Alternatively, one or more of the feedback modules 42, 44, 46 may be configured to isolate a plurality of signals corresponding to oscillations at two or more of the different predetermined frequencies. For example, the feedback module may comprise a plurality of band pass filters. In this way a single feedback module may be configured to generate a plurality of error signals allowing rates of rotation of the WGM inertial sensor 2 to be determined about a plurality of different axes, e.g. aligned in different directions of the WGM inertial sensor 2.

In the arrangements described above, the actuator assembly 50 comprises a plurality of actuators, e.g. piezoelectric elements 50x, 50y, 50z, configured to apply the restoring forces to the WGM resonator 10. However, in other arrangements, the restoring forces may additionally or alternatively be applied to the WGM resonator 10 by the evanescent couplers, which may apply an optical gradient force to the WGM resonator by virtue of the evanescent field established between the evanescent coupler and the WGM resonator 10. In such arrangements, the WGM inertial sensor 2 may comprise one or more further lasers configured to provide light to the evanescent couplers in order to generate or augment the optical gradient force. The further lasers may be configured to generate light at a different frequency to the laser 100. The intensity, e.g. power, of light supplied from the laser 100 and/or further lasers (if provided) to the evanescent couplers may be adjusted in order to adjust the optical gradient force applied to the WGM resonator 10. Additionally or alternatively, further evanescent couplers may be provided in order to apply the optical gradient force to the WGM resonator 10. Light may be supplied to the further evanescent couplers by the laser 100 or one or more further lasers.

Figure 7:
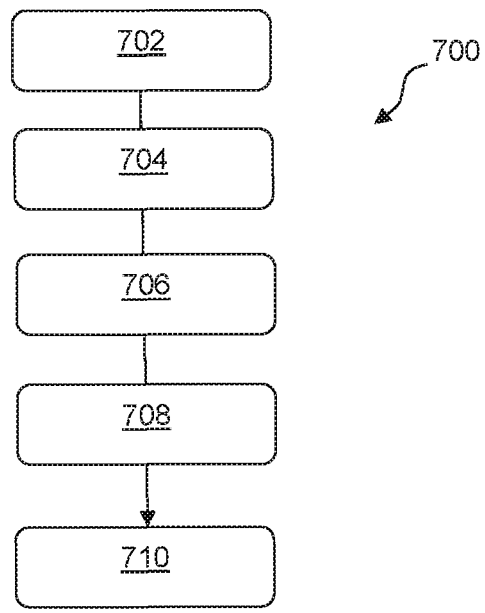
FIG. 7 shows a method of operating a whispering gallery mode inertial sensor according to arrangements of the present disclosure.

With reference to FIG. 7, a method 700 of operating the whispering gallery mode inertial sensor 2, according to arrangements of the present disclosure, will now be described. The method comprises a first step 702, in which light is supplied to an evanescent coupler of the WGM inertial sensor. As described above, the evanescent coupler is arranged about the WGM resonator of the WGM inertial sensor such that the light is transmitted to the WGM resonator and received back from the WGM resonator by the evanescent coupler.

In a second step 704, a displacement of the whispering gallery mode resonator is determined according to the light, e.g. the intensity of light, received from the whispering gallery mode resonator by the evanescent coupler.

The method 700 further comprises a third step 706, in which an acceleration experienced by the WGM resonator is determined based on the displacement of the WGM resonator, e.g. based on the measurements of the light received from the WGM resonator by the evanescent coupler.

In a fourth step 708 of the method 700, a restoring force is applied to the WGM resonator. The level of restoring force applied to the WGM resonator is controlled using a closed feedback loop based on the displacement of the WGM resonator, e.g. from a set point. As described above, the restoring force is applied in order to maintain a predetermined mechanical state of the whispering gallery mode resonator.

The method further comprises a fifth step 710, in which a timing signal is determined based on an optical frequency comb produced by the whispering gallery mode resonator. As described above, the process by which the timing signal is determined may be adjusted in order to account for accelerations and rotations of the WGM resonator 10.

The WGM inertial sensor described above may be provided as part of a Position, Navigation and Timing (PNT) system. The PNT system may utilize the accelerations and rotations determined by the controller 40 or further controller 70 to determine the displacement and/or rate of rotation of the PNT system, in/about one or more axes, from a known starting position and/or orientation. For example, the PNT may integrate the values of acceleration and rate of rotation determined by the WGM inertial sensor 2 using the timing signal $S_T$ generated by the WGM inertial sensor 2. The further controller 70 may apply algorithmic methods to determine navigation information, e.g. based on Kalman filtering. The WGM inertial sensors 2 thereby provides the PNT system with all the information required for determining the displacement and rotation of the PNT system.

The use of feedback control to counteract displacements of the WGM resonator in response to inertial forces, and to control predetermined oscillations of the WGM resonation to enable rotation measurements, as described herein, extends the sensing range of the WGM inertial sensor, reduces long term drift and reduces non-linearity of the sensors response to inertial forces. The present disclosure therefore addresses common sources of error inherent when using sensors, such as acceleration, rotation and/or timing sensors, for PNT.

It will be appreciated by those skilled in the art that although the invention has been described by way of example, with reference to one or more exemplary examples, it is not limited to the disclosed examples and that alternative examples could be constructed without departing from the scope of the invention as defined by the appended claims.

The invention claimed is:

1. A whispering gallery mode inertial sensor comprising:
    a whispering gallery mode resonator;
    an evanescent coupler configured to couple with an evanescent field of the whispering gallery mode resonator so that light is transmitted to and received from the whispering gallery mode resonator by the evanescent coupler;
    a displacement sensor configured to determine a displacement of the whispering gallery mode resonator according to the light received from the whispering gallery mode resonator by the evanescent coupler;
    a controller configured to determine an acceleration and/or rate of rotation experienced by the whispering gallery mode resonator based on the displacement of the whispering gallery mode resonator, the controller being further configured to apply a restoring force to the whispering gallery mode resonator in a closed feedback loop based on the displacement of the whispering gallery mode resonator in order to maintain a predetermined mechanical state of the whispering gallery mode resonator, wherein the restoring force is applied by a piezoelectric actuator; and
    a timing sensor configured to determine a timing signal based on an optical frequency comb produced by the whispering gallery mode resonator.

2. The whispering gallery mode inertial sensor of claim 1, wherein the acceleration and/or rate of rotation experienced by the whispering gallery mode resonator is determined according to an error signal generated by the controller in the closed feedback loop.

3. The whispering gallery mode inertial sensor of claim 1, wherein the controller is configured to apply at least one of proportional, differential, and integral control within the closed feedback loop to determine the magnitude of the restoring force.

4. The whispering gallery mode inertial sensor of claim 1, wherein the timing signal is adjusted by controlling at least one of a frequency and an intensity of light used to generate the optical frequency comb in order to at least partially counteract changes caused by motion of the whispering gallery mode resonator.

5. The whispering gallery mode inertial sensor of claim 1, wherein the whispering gallery mode inertial sensor comprises at least two evanescent couplers arranged orthogonally to one another.

6. The whispering gallery mode inertial sensor of claim 1, wherein the whispering gallery mode inertial sensor comprises at least two displacement sensors configured to determine the displacement of the whispering gallery mode resonator in at least two orthogonal directions.

7. The whispering gallery mode inertial sensor of claim 1, wherein the controller is configured to apply at least two restoring forces orthogonally to one another.

8. The whispering gallery mode inertial sensor of claim 1, wherein the whispering gallery mode inertial sensor comprises at least two actuators arranged orthogonally to one another.

9. The whispering gallery mode inertial sensor of claim 1, wherein the predetermined mechanical state of the whispering gallery mode resonator is one of (1) a state in which the whispering gallery mode resonator is substantially stationary, and (2) a state in which the whispering gallery mode resonator vibrates in a first predetermined direction at a first predetermined frequency.

10. The whispering gallery mode inertial sensor of claim 1, wherein the predetermined mechanical state of the whispering gallery mode resonator is a state in which the whispering gallery mode resonator vibrates in a second predetermined direction at a second predetermined frequency.

11. The period whispering gallery mode inertial sensor of claim 1, wherein the whispering gallery mode resonator is supported on a cantilever beam.

12. The whispering gallery mode inertial sensor of claim 1, wherein the whispering gallery mode resonator is supported by at least two cantilevers extending from the whispering gallery mode resonator to a frame.

13. The whispering gallery mode inertial sensor of claim 1, wherein the whispering gallery mode inertial sensor is configured to determine at least one of a linear acceleration and a rate of rotation experienced by the whispering gallery mode resonator in at least one direction.

14. The whispering gallery mode inertial sensor of claim 1, wherein the rate of rotation experienced by the whispering gallery mode resonator is determined by measuring a magnitude of oscillation of the whispering gallery mode resonator at a first frequency in the second direction and/or at a second frequency in the first direction.

15. A position, navigation, and timing system comprising the whispering gallery mode inertial sensor according to claim 1, wherein the system is configured to determine at least one of a displacement and angle of rotation of the system according to at least one of a linear acceleration and rate of rotation determined by the whispering gallery mode resonator, and the timing signal determined by the timing sensor.

16. A method of operating a whispering gallery mode inertial sensor, wherein the whispering gallery mode inertial sensor includes a whispering gallery mode resonator and an evanescent coupler configured to couple with an evanescent field of the whispering gallery mode resonator, wherein the method comprises the steps of:

supplying light to the evanescent coupler so that light is transmitted to and received from the whispering gallery mode resonator by the evanescent coupler;

determining a displacement of the whispering gallery mode resonator according to the light received from the whispering gallery mode resonator by the evanescent coupler;

determining an acceleration and/or rate of rotation experienced by the whispering gallery mode resonator based on the displacement of the whispering gallery mode resonator;

applying a restoring force to the whispering gallery mode resonator in a closed feedback loop based on the displacement of the whispering gallery mode resonator in order to maintain a predetermined mechanical state of the whispering gallery mode resonator by a piezoelectric actuator; and determining a timing signal based on an optical frequency comb produced by the whispering gallery mode resonator.

17. The method of claim 16, wherein the method further comprises the step of supplying light bi-directionally to the evanescent coupler in order to establish counter-propagating whispering gallery mode resonances within the whispering gallery mode resonator.

18. The method of claim 16, wherein the method comprises the step of supplying at least two light beams between which at least one of frequency, intensity, phase, and polarization differs in order to establish at least two whispering gallery mode resonances of the light within the whispering gallery mode resonator.

* * * * *